United States Patent
Pratt et al.

[11] Patent Number: 6,132,895
[45] Date of Patent: Oct. 17, 2000

[54] FUEL CELL

[75] Inventors: Steven D. Pratt; Sivakumar Muthuswamy, both of Plantation; Ronald J. Kelley, Coral Springs; James Lynn Davis, Parkland, all of Fla.

[73] Assignee: Motorola, Inc., Schaumburg, Ill.

[21] Appl. No.: 09/036,713

[22] Filed: Mar. 9, 1998

[51] Int. Cl.[7] .................................................. H01M 2/14
[52] U.S. Cl. .............................................. 429/39; 429/32
[58] Field of Search .................................. 429/32, 34, 38, 429/39

[56] References Cited

U.S. PATENT DOCUMENTS

| | | | |
|---|---|---|---|
| 4,950,562 | 8/1990 | Yoshida et al. | 429/32 |
| 5,094,928 | 3/1992 | Dyer | 429/33 |
| 5,372,896 | 12/1994 | Binder et al. | 429/33 |
| 5,486,430 | 1/1996 | Gorbell et al. | 429/35 |
| 5,514,487 | 5/1996 | Washington et al. | 429/39 |
| 5,683,828 | 11/1997 | Spear et al. | 429/13 |

*Primary Examiner*—Kathryn Gorgos
*Assistant Examiner*—Thomas H Parsons
*Attorney, Agent, or Firm*—Dale W. Dorinski

[57] ABSTRACT

A very thin fuel cell (500) is formed by stacking a plurality of membrane electrode assemblies (MEA) (210) and a plurality of double sided distribution plates (220). The distribution plates serve to distribute fuel and oxidant to the MEAs, and they are electrically and thermally conductive and gas impermeable, and have fuel and oxidant distribution channels formed on opposite sides. The oxidant flowing through the oxidant distribution channels also provides thermal management to the fuel cell, eliminating the need for a separate heat exchange system. The MEAs and the distribution plates are arranged in an alternating stack (200) such that the fuel distribution channel side (315) is in intimate and direct contact with the MEA anode (212), and such that the oxidant distribution channel (415) is in intimate and direct contact with the MEA cathode (214). The distribution plate acts as a bipolar plate and also as a heat exchanger.

17 Claims, 4 Drawing Sheets

FUEL CELL

BACKGROUND OF THE INVENTION

1. Field of the Invention

This invention relates to fuel cells.

2. Description of the Related Art

Fuel cells are electrochemical cells in which a free energy change resulting from a fuel oxidation reaction is converted into electrical energy. As shown in FIG. 1, a typical fuel cell 10 consists of a fuel electrode (anode) 12 and an oxidant electrode (cathode) 14, separated by an ion-conducting electrolyte 16. The electrodes are connected electrically to a load (such as an electronic circuit) 18 by an external circuit conductor. In the circuit conductor, electric current is transported by the flow of electrons, whereas in the electrolyte it is transported by the flow of ions, such as the hydrogen ion ($H^+$) in acid electrolytes, or the hydroxyl ion ($OH^-$) in alkaline electrolytes. In theory, any substance capable of chemical oxidation that can be supplied continuously (as a gas or fluid) can be oxidized galvanically as the fuel 22 at the anode 12 of a fuel cell. Similarly, the oxidant 24 can be any material that can be reduced at a sufficient rate. For specialized systems, both reactants might be liquids, such as hydrazine for the fuel and hydrogen peroxide or nitric acid for the oxidant. Gaseous hydrogen has become the fuel of choice for most applications, because of its high reactivity in the presence of suitable catalysts and because of its high energy density when stored as a cryogenic liquid, such as for use in space. Similarly, at the fuel cell cathode 14 the most common oxidant is gaseous oxygen, which is readily and economically available from the air for fuel cells used in terrestrial applications. When gaseous hydrogen and oxygen are used as fuel and oxidant, the electrodes are porous to permit the gas-electrolyte junction to be as great as possible. The electrodes must be electronic conductors, and possess the appropriate reactivity to give significant reaction rates. The most common fuel cells are of the hydrogen-oxygen variety that employ an acid electrolyte. At the anode 12, incoming hydrogen gas 22 ionizes to produce hydrogen ions and electrons. Since the electrolyte is a non-electronic conductor, the electrons flow away from the anode via the metallic external circuit. At the cathode 14, oxygen gas 24 reacts with the hydrogen ions migrating through the electrolyte 16 and the incoming electrons from the external circuit to produce water as a byproduct. Depending on the operating temperature of the cell, the byproduct water may enter the electrolyte, thereby diluting it and increasing its volume, or be extracted through the cathode as vapor. The overall reaction that takes place in the fuel cell is the sum of the anode and cathode reactions; in the present case, the combination of hydrogen with oxygen to produce water, with part of the free energy of reaction released directly as electrical energy. The difference between this available free energy and the heat of reaction is produced as heat at the temperature of the fuel cell. It can be seen that as long as hydrogen and oxygen are fed to the fuel cell, the flow of electric current will be sustained by electronic flow in the external circuit and ionic flow in the electrolyte.

In practice, a number of fuel cells are normally stacked or 'ganged' together to form a fuel cell assembly. These traditional types of fuel cells use extremely complex flat stack arrangements consisting of a membrane, gaskets, channels, electrodes and current collectors that are difficult and expensive to fabricate and assemble, and are highly subject to catastrophic failure of the entire system if a leak develops. As can be easily appreciated, the cost of fabricating and assembling fuel cells is significant, due to the materials and labor involved. Typically, 85% of a fuel cell's cost is attributable to manufacturing costs. For example, U.S. Pat. No. 5,683,828 describes a fuel cell stack employing a complex separator assembly that is a laminated structure of seven (7) layers adhesively bonded together. These laminated platelets provide humidification to the electrode assemblies and have separate channels that are dedicated to passing cooling water through the fuel cell stack for thermal management. Thus, the complexity of U.S. Pat. No. 5,683,828 and other fuel cell structures is one of the factors preventing widespread acceptance of fuel cell technology. An improved style of fuel cell that is less complex and less prone to failure would be a significant addition to the field.

DETAILED DESCRIPTION OF THE PREFERRED EMBODIMENT

A very thin fuel cell is formed by stacking a plurality of membrane electrode assemblies (MEA) and a plurality of double sided distribution plates. Each MEA consists of a solid electrolyte disposed between and in intimate contact with an anode and a cathode, framed by a sealing material such as rubber or expanded polytetrafluoroethylene. The double sided distribution plates serve to distribute fuel and oxidant to the membrane electrode assemblies, and also to provide thermal management to the fuel cell. A separate cooling system is not needed, as the oxidant flowing throughout the stack also serves to carry away the heat of reaction as it exits from the fuel cell. The distribution plates are electrically conductive and gas impermeable, and have fuel distribution channels formed on one side and oxidant distribution channels formed on the opposite side. The double sided distribution plates are typically flat and thin (less than 2 mm), and formed from a single sheet of metal and the channels are chemically or mechanically milled, stamped, or otherwise formed into one or both major surfaces of the plate. The MEAs and the double sided distribution plates are arranged in an alternating stack such that the fuel distribution channel side of the double sided distribution plate is in intimate and direct contact with the anode of the membrane electrode assembly, and such that the oxidant distribution channel side of the double sided distribution plate is in intimate and direct contact with the cathode of the membrane electrode assembly. Fuel is fed to the fuel distribution channel, and oxidant is fed to the oxidant distribution channel of at least one double sided distribution plate. An end cap at the top and at the bottom of the stack holds the entire assembly together.

Figure 1:
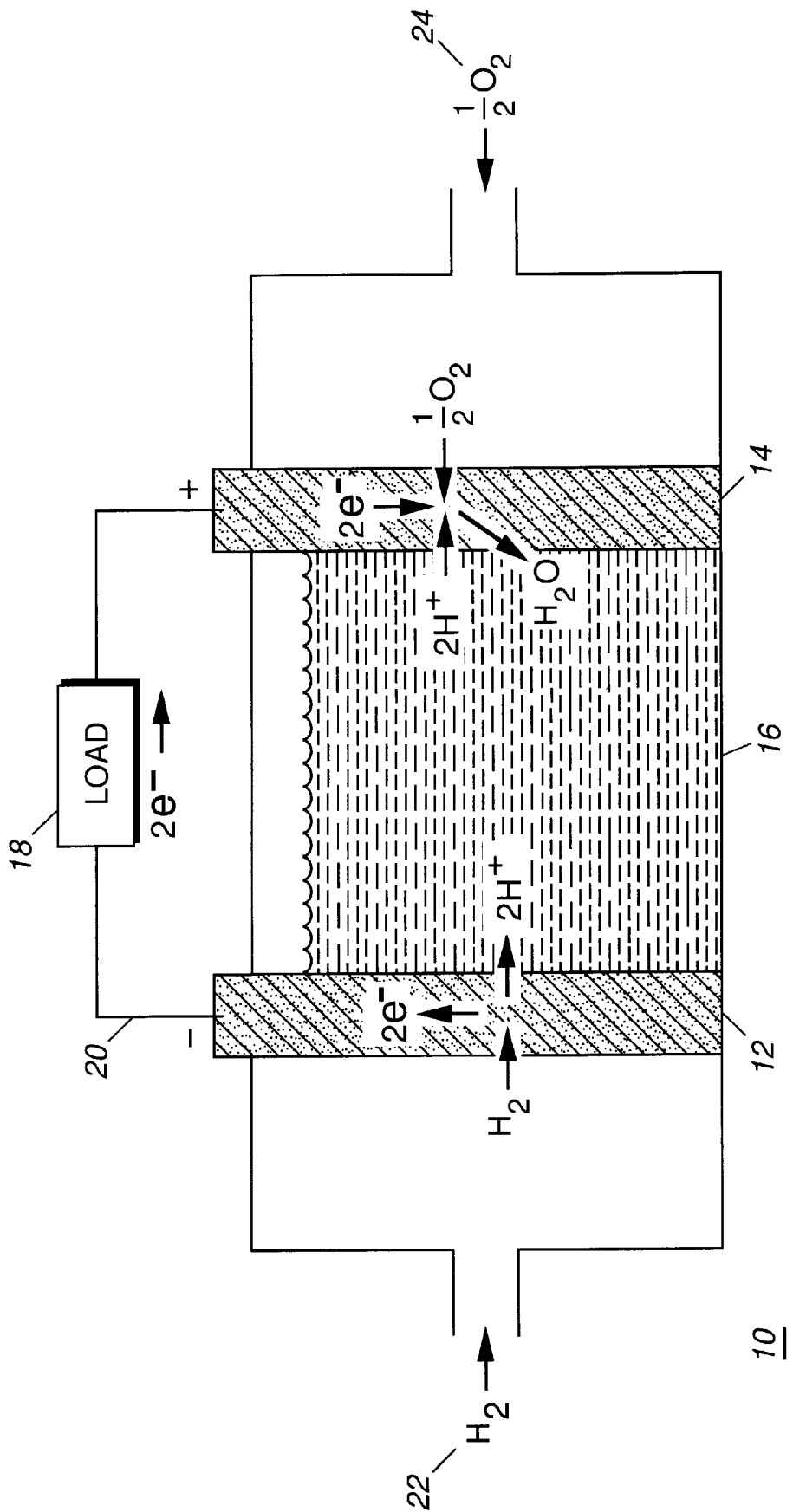
FIG. 1 is schematic representation of a typical fuel cell as practiced in the prior art.
Figure 2:
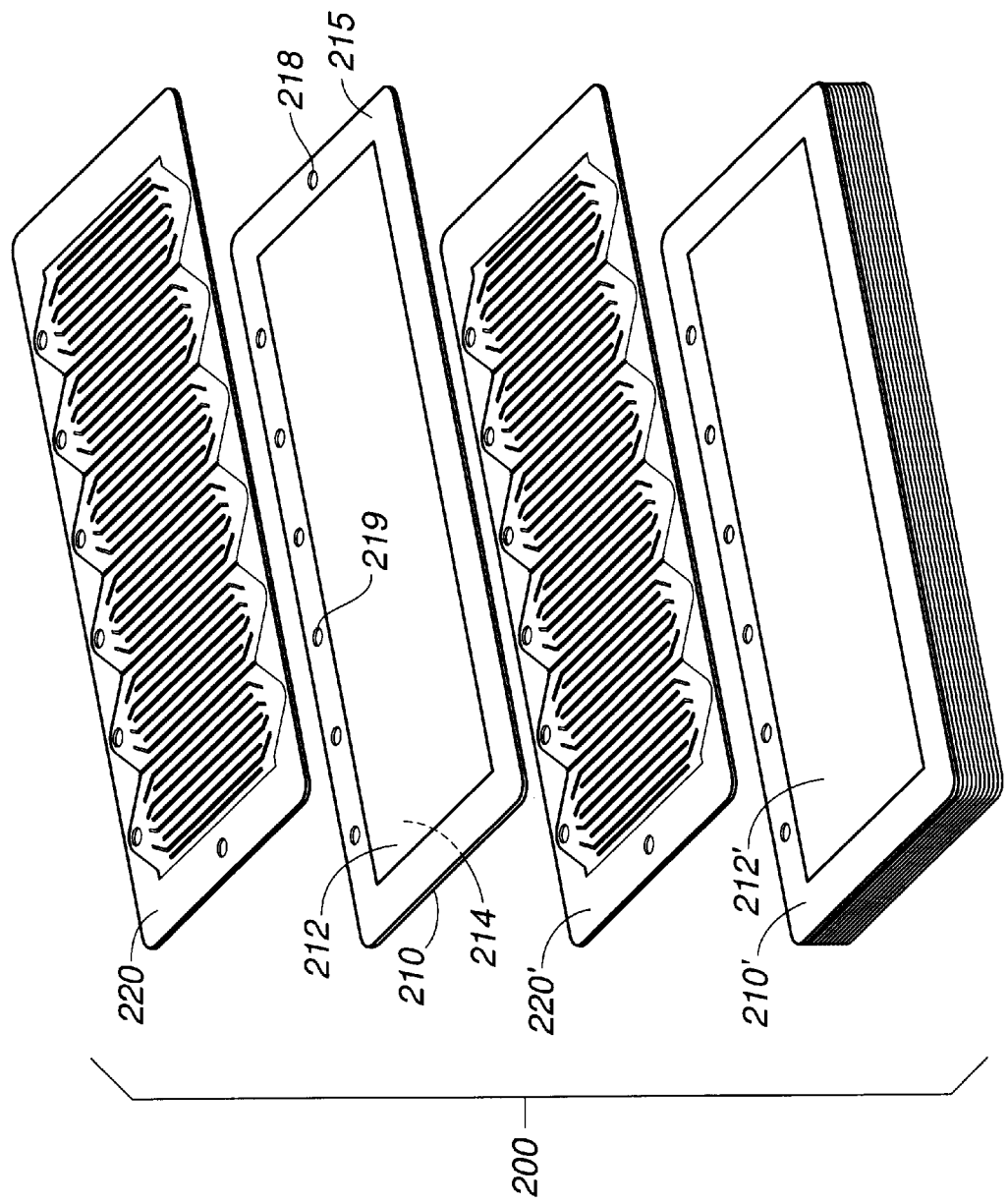
FIG. 2 is an exploded isometric view of a fuel cell stack in accordance with the invention.

Referring now to FIG. 2, the heart of the fuel cell is a stack 200 of membrane electrode assemblies 210 and double sided distribution plates 220 arranged so that they alternate in layers. As used in the context of this discussion and elsewhere in the literature, a membrane electrode assembly (MEA) is a laminated unit cell consisting of an anode 212, a cathode 214 and an electrolyte sandwiched between the anode and the cathode (the laminated unit cell is optionally framed by a sealing material 215). In the preferred embodiment, the electrolyte is a polymer electrolyte membrane (PEM), such as is typically used in a hydrogen fuel cell, a direct methanol PEM cell, or a PEM fuel cell using an organic fuel such as ethanol or formaldehyde. Suitable materials for the PEM are perfluorinated sulfonic acid derived from fluorinated styrenes, perfluorinated sulfonic acid derived from fluorinated ethylenes, and polybenzimidazole. PEMs are ionic polymers having very high ion conductivity. The polymeric nature of PEMs makes them much easier to handle than liquid electrolytes, and the physical construction of the electrochemical cell is greatly simplified since elaborate seals and containment systems are not needed to contain corrosive liquid electrolytes. PEMs have the following properties: (1) high ionic conductivity, (2) zero electronic conductivity, (3) very low permeability to gases, (4) chemical stability at operating temperature, (5) mechanical strength, (6) low sensitivity to humidity, and (7) compatibility with catalyst. Fuel cells employing PEMs are described and known in the literature (see, for example, U.S. Pat. No. 5,403,675), and since one of ordinary skill in the art is assumed to be familiar with PEM cells, they will not be further elaborated upon here.

FIG. 2 shows a portion of the fuel cell stack exploded to aid in understanding the invention. It is understood that the remainder of the stack that is not shown in exploded view is similar in construction to the exploded portion. Sandwiched to each of the MEAs 210, 210' in the stack is an electrically conductive and thermally conductive double sided distribution plate that provides electrical conductivity from the cathode 214 of one MEA 210 to the anode 212' of a neighboring MEA 210'. The cathode 214 in the MEA is isolated from it's anode 212 by the PEM (not shown), and electrically joined to the next MEA anode 212' by the electrically conductive distribution plate 220'. A fuel cell stack can be created by alternating the MEAs with the double sided distribution plates in a fashion where n (n being an integer greater than 2) MEAs are combined with n-1 distribution plates to create the fuel cell stack. Of course, one skilled in the art will realize that the fuel cell stack should also contain end caps over the outermost electrodes, which will be further explained in FIG. 5.

Figure 3:
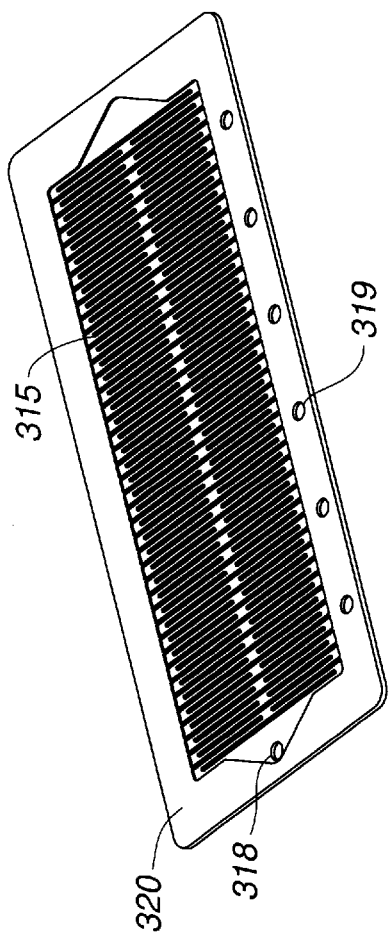
FIG. 3 is an isometric view of a double sided distribution plate showing one embodiment of fuel distribution channels.
Figure 4:
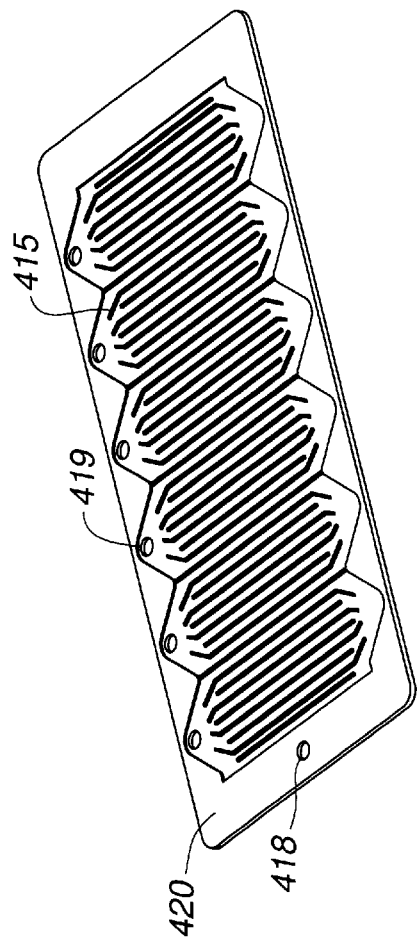
FIG. 4 is an isometric view of a double sided distribution plate showing one embodiment of oxidant distribution channels.

Details of the double sided distribution plate will now be elucidated with ready reference to FIGS. 3 and 4. FIG. 3 shows one embodiment of a pattern 315 of fuel channels formed on one surface of the double sided distribution plate 320. In the preferred embodiment, the distribution plate 320 is a thin metal plate formed from a single piece of material that has patterns formed on both surfaces. Required properties of our distribution plate include non-reactivity with the fuel and/or oxidant, good electrical conductivity, good thermal conductivity, and fuel/oxidant impermeability. In the context of this invention, 'good electrical conductivity' means the distribution plate material has a resistivity value of 15 $\mu$ohm-cm. or less at 25° C., and 'good thermal conductivity' means a thermal conductivity in excess of 0.25 Kcal/sec-cmC°. Prior art graphite fuel cell plates do not meet our standards of "good electrical conductivity." Some materials that meet these criteria are shown in the following table.

|  | Thermal Conductivity Kcal/Sec-cm° C. | Electrical Conductivity $\mu$ohm-cm. | Specific Gravity g/cm$^3$ |
| --- | --- | --- | --- |
| Aluminum alloy 3003, rolled ASTM B221 | 0.68 | 4 | 2.73 |
| Aluminum alloy 2017, annealed ASTM B221 | 0.72 | 4 | 2.8 |
| Aluminum alloy 380 ASTM SC84B | 0.42 | 7.5 | 2.7 |
| Copper ASTM B152, B124, B133, B1,B2,B3 | 1.70 | 1.7 | 8.91 |
| Yellow brass (high brass) ASTM B36, B134, B135 | 0.52 | 7 | 8.47 |
| Aluminum bronze ASTM B169, alloy A; ASTM B124,,B150 | 0.31 | 12 | 7.8 |
| Red brass (cast) ASTM B30, No. 4A | 0.32 | 11 | 8.7 |
| Magnesium alloy AZ31B | 0.34 | 9 | 1.77 |
| Nickel | 0.26 | 10 | 8.89 |
| Zinc | 0.47 | 6 | 7.14 |

Source: CRC "Handbook of Chemistry and Physics"

When gaseous fuels are used, the plate must be gas impermeable. In the preferred embodiment, the metal distribution plate is aluminum or magnesium, about 1–2 mm thick. Thicker plates can be used, but are less effective, bulkier, and make a fuel cell assembly that is larger than necessary. A protective coating may optionally be applied over the distribution plate to enhance corrosion resistance. FIG. 4 shows one embodiment of a pattern 415 of oxidant channels formed on one surface of the double sided distribution plate 420. As previously noted above, we have chosen materials for our distribution plates that have good thermal conductivity in order to provide thermal management to the fuel cell stack. We have eliminated the complex system of water cooling pipes and channels that are typically employed in conventional fuel cells (see, for example, the water cooling system in U.S. Pat. No. 5,683,828) by using the oxidant as a thermal management media. Thus, the material flowing through the pattern 415 of oxidant channels serves not only to provide oxidant to the electrode assembly, it acts as a heat sink to carry away the heat of reaction produced in the fuel cell, eliminating the need for a separate water cooled heat exchanger. Both gaseous and liquid oxidants can be used in our system. In practice, the fuel distribution channels 315 are formed on one side of the plate and the oxidant distribution channels 415 are formed on the opposite side. These channels are conventionally formed in the graphite plates of prior art fuel cells by costly mechanical machining, thereby limiting the lower limit of size. In our invention, they can by formed in the surface by several methods that cannot be employed with graphite, and thus are more efficient, less costly, and can be made much smaller. Examples of some pattern forming methods are etching coupled with photolithography using a photo active layer, micromachining, or laser milling. Depending on the types of fuel and oxidant employed, the pattern in the two sides can be the same or different. When hydrogen gas is used as the fuel and air is used as the oxidant, different patterns are most effective, since only 20% of the air supplied is oxidant, thus the pattern in the oxidant side should be made differently than the fuel side. Increasing the size of the oxidant channels also aids in providing greater oxidant flow through the fuel cell stack, thus increasing the capability for thermal management (i.e. heat sinking). The preferred method of making the channels is by chemically etching them, using photolithography. This generally results in channels that are 0.1 to 1 mm deep, with about 0.4 mm being preferred. Of course, other means of forming the channels, such as by machining, can also be used, but the most accurate and cost effective means is to chemically etch them. Chemical etching also results in channels that have a surface that is microscopically rough, and this aids in gas flow distribution and heat exchange, which is also an advantage of our invention. As shown in FIG. 4, the channels may be arranged in a manifold network to aid in distributing the fuel or oxidant supply to the MEA sealing material 215. Appropriately placed holes 318, 418 in the plate serve to allow the fuel to flow to the distribution channels 315 and to the next distribution plate in the stack. Referring back to FIG. 2 for a moment, one can see that a corresponding hole 218 is formed in the MEA. Similarly, holes 319, 419 in the plate serve to allow the oxidant to flow to the distribution channels 415 and up or down to the next distribution plate in the stack. Corresponding holes 219 are also formed in the MEA sealing material 215. In the preferred embodiment, each of the metal plates with channels are stacked such that the feed holes form a continuous zigzag path from the bottom of the stack to the top. This is brought about by rotating alternate distribution plates 180 degrees about the vertical axis of the stack. Thus, the fuel is circulated on one side of the electrolyte while the oxidant flows on the other side. This is a very compact design, that results in a fuel cell that has a power density in excess of 5 watts/cm$^3$, which is heretofore unrealized with fuel cells of the prior art.

Figure 5:
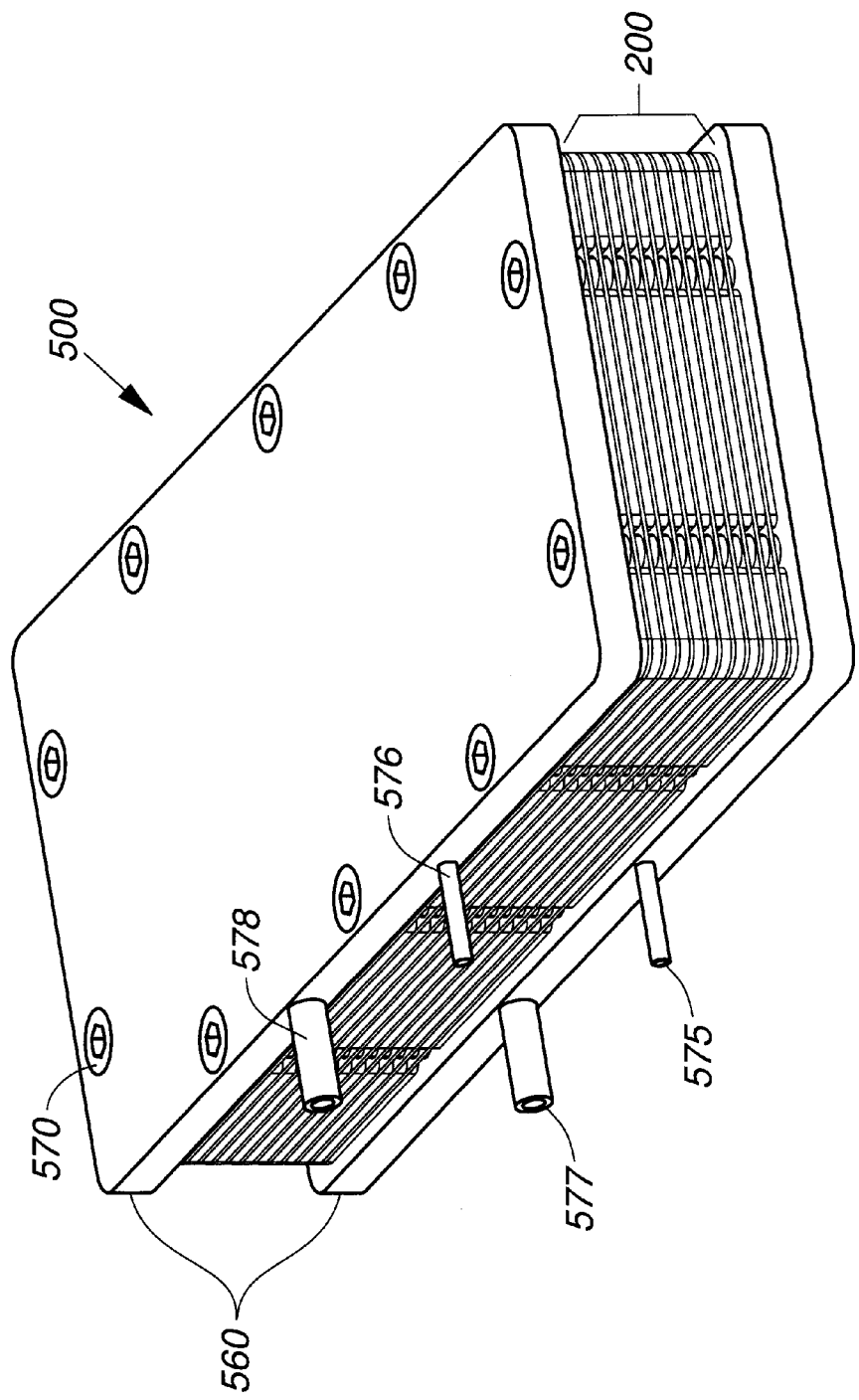
FIG. 5 is an isometric view of an assembled fuel cell in accordance with the invention.

Referring now to FIG. 5, the fuel cell 500 is assembled by combining the stack 200 of MEAs and distribution plates with fuel and oxidant inlet and outlets and some end caps. The stack 200 consists of the MEAs 210, 210', etc. and the distribution plates 220, 220', etc. layered in alternating fashion as shown in FIG. 2. In the stack, the top and bottom distribution plates have channels formed only on one side. In the preferred embodiment, the holes 218, 219, 318, 319, 418, 419 in the plates and the MEAs are arranged so that the fuel and oxidant remain separated and they move vertically through the stack from one distribution plate to the next. The channels in the individual plates can be arranged in parallel or in series, depending on the desired design of the cell. End caps 560 are placed on the top and bottom of the stack, and the entire assembly is held together with appropriate mechanical fasteners 570, such as screws. Fuel introduction and exhaust ports 575 and 576, respectively, and oxidant introduction and exhaust ports 577 and 578, respectively, are typically located in the end caps and are appropriately ported to the holes in the distribution plates in conventional fashion. If desired, the walls of the stack are then potted or coated with a sealant, such as epoxy, to provide a gas-tight fuel cell.

Thus, we have created a very thin fuel cell that does not require separate gaskets, screens, spacers, or adhesives as in the prior art, simplifying the design and reducing the cost. This unique cell eliminates the need for expensive and fragile graphite bipolar plates. It provides a high capacity, low mass fuel cell with higher power density than prior art cells. It is easy and inexpensive to fabricate, and the metal distribution plates also serve as heat exchangers and current collectors, thus eliminating the need for a separate heat exchanger. While the preferred embodiments of the invention have been illustrated and described, it will be clear that the invention is not so limited, and other equivalents will occur to those skilled in the art without departing from the spirit and scope of the present invention as defined by the appended claims.

What is claimed is:

1. A fuel cell, comprising:
   a plurality of membrane electrode assemblies, each comprising a solid polymer electrolyte membrane disposed between and in intimate contact with an anode and a cathode;
   a plurality of double sided distribution plates, each formed from a single piece of material, for distributing fuel and oxidant to the membrane electrode assemblies, the distribution plates being good electrical and good thermal conductors and gas impermeable and having fuel distribution channels formed on one side and oxidant distribution channels formed on an opposite side;
   the plurality of membrane electrode assemblies and the plurality of distribution plates arranged in an alternating stack such that the fuel distribution channel side of the distribution plate is in intimate and direct contact with the anode of the membrane electrode assembly, and such that the oxidant distribution channel side of the distribution plate is in intimate and direct contact with the cathode of the membrane electrode assembly;
   fuel input means connected to the fuel distribution channel of at least one distribution plate; and
   oxidant input means connected to the oxidant distribution channel of at least one distribution plate.

2. The fuel cell as described in claim 1, wherein the distribution plate also serves as a current collector.

3. The fuel cell as described in claim 1, wherein the oxidant distribution channels also serve to provide thermal management to the fuel cell.

4. The fuel cell as described in claim 1, wherein the distribution plate does not have dedicated cooling water distribution channels.

5. The fuel cell as described in claim 1, wherein the distribution channels comprise a manifold network.

6. The fuel cell as described in claim 1, wherein the fuel distribution channels of each plate are directly connected to each other in series.

7. The fuel cell as described in claim 1, wherein the fuel distribution channels of each plate are directly connected to each other in parallel.

8. The fuel cell as described in claim 1, further comprising fuel and oxidant connecting channels formed in a perimeter portion of the double sided distribution plates and in a perimeter portion of the membrane electrode assemblies, such that the fuel and oxidant remain separated and move vertically through the stack from one distribution plate to the next.

9. The fuel cell as described in claim 1, wherein the plurality of double sided distribution plates are aluminum.

10. The fuel cell as described in claim 1, wherein the solid electrolyte comprises a polymer film selected from the group consisting of perfluorinated sulfonic acid derived from fluorinated styrenes, perfluorinated sulfonic acid derived from fluorinated ethylenes, and polybenzimidazole.

11. The fuel cell as described in claim 1, wherein the fuel and oxidant are gases.

12. The fuel cell as described in claim 11, wherein the fuel is hydrogen and the oxidant is air.

13. The fuel cell as described in claim 1, wherein a seal is made between the membrane electrode assembly and the double sided distribution plate without the use of a gasket.

14. A fuel cell, comprising:
a plurality of membrane electrode assemblies, each comprising a solid polymer electrolyte membrane disposed between and in intimate contact with an anode and a cathode;
a plurality of double sided distribution plates, each formed from a single piece of material, for distributing fuel and oxidant to the membrane electrode assemblies, the distribution plates being good electrical and good thermal conductors and gas impermeable and having fuel distribution channels formed on one side and oxidant distribution channels formed on an opposite side, and wherein the fuel and oxidant distribution channels are different patterns;
the plurality of membrane electrode assemblies and the plurality of distribution plates arranged in an alternating stack such that the fuel distribution channel side of the distribution plate is in intimate and direct contact with the anode of the membrane electrode assembly, and such that the oxidant distribution channel side of the distribution plate is in intimate and direct contact with the cathode of the membrane electrode assembly;
fuel input means connected to the fuel distribution channel of at least one distribution plate; and
oxidant input means connected to the oxidant distribution channel of at least one distribution plate.

15. A fuel cell, comprising:
a plurality of membrane electrode assemblies, each comprising a solid polymer electrolyte membrane disposed between and in intimate contact with an anode and a cathode;
a plurality of double sided distribution plates, each formed from a single piece of material, for distributing fuel and oxidant to the membrane electrode assemblies, the distribution plates being good electrical and good thermal conductors and gas impermeable and having fuel distribution channels formed on one side and oxidant distribution channels formed on an opposite side;
the plurality of membrane electrode assemblies and the plurality of distribution plates arranged in an alternating stack such that the fuel distribution channel side of the distribution plate is in intimate and direct contact with the anode of the membrane electrode assembly, and such that the oxidant distribution channel side of the distribution plate is in intimate and direct contact with the cathode of the membrane electrode assembly;
fuel input means connected to the fuel distribution channel of at least one distribution plate;
oxidant input means connected to the oxidant distribution channel of at least one distribution plate; and
wherein the fuel cell power density is in excess of 5 watts/cm$^3$.

16. A fuel cell, comprising:
a plurality of membrane electrode assemblies, each comprising a film of solid polymer electrolyte disposed between and in intimate contact with an anode and a cathode;
a plurality of metal distribution plates, each formed from a single piece of metal, for distributing fuel and oxidant to the plurality of membrane electrode assemblies, the distribution plates being good electrical and good thermal conductors and having fuel distribution channels formed into the surface of one side and oxidant distribution channels formed into the surface of the opposing side;
the plurality of membrane electrode assemblies and the plurality of metal distribution plates arranged in an alternating stack such that the metal distribution plates separate one membrane electrode assembly from another;
the fuel distribution channel side of the metal distribution plate being in intimate and direct contact with the anode portion of the membrane electrode assembly;
the oxidant distribution channel side of the metal distribution plate being in intimate and direct contact with the cathode portion of the membrane electrode assembly, and the oxidant distribution channel serving as a passageway to remove heat from the fuel cell; and
the oxidant distribution channel of one metal distribution plate is connected in series to the oxidant distribution channel of at least one other metal distribution plate;
fuel input means connected to the fuel distribution channel of at least one metal distribution plate; and
oxidant input means connected to the oxidant distribution channel of at least one metal distribution plate.

17. A fuel cell, comprising:
a plurality of membrane electrode assemblies, each comprising a polymer electrolyte disposed between an anode and a cathode;
a plurality of double sided gas distribution plates that do not contain dedicated cooling water channels, said plates formed from one sheet of metal and having channels formed only on two major exterior faces, the distribution plates being good electrical and good thermal conductors and gas impermeable; and
the plurality of membrane electrode assemblies and the plurality of distribution plates arranged in an alternating stack such that the channels on one major face of the distribution plate are in intimate and direct contact with the anode of the membrane electrode assembly, and such that the channels on the other major face of the distribution plate are in intimate and direct contact with the cathode of the membrane electrode assembly;
fuel input means connected to at least one distribution plate; and
oxidant input means connected to at least one distribution plate.

* * * * *